United States Patent
Deng

(10) Patent No.: US 11,055,223 B2
(45) Date of Patent: Jul. 6, 2021

(54) EFFICIENT CACHE WARM UP BASED ON USER REQUESTS

(71) Applicant: Alibaba Group Holding Limited, Grand Cayman (KY)

(72) Inventor: Wenjia Deng, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 543 days.

(21) Appl. No.: 15/209,627

(22) Filed: Jul. 13, 2016

(65) Prior Publication Data

US 2017/0017574 A1   Jan. 19, 2017

(30) Foreign Application Priority Data

Jul. 17, 2015   (CN) .......................... 201510425549.X

(51) Int. Cl.
  G06F 12/0862   (2016.01)
(52) U.S. Cl.
  CPC .. G06F 12/0862 (2013.01); *G06F 2212/1021* (2013.01); *G06F 2212/1024* (2013.01); *G06F 2212/281* (2013.01); *G06F 2212/602* (2013.01); *G06F 2212/6024* (2013.01); *G06F 2212/6026* (2013.01)
(58) Field of Classification Search
  CPC ..... G06F 2212/1021; G06F 2212/6026; G06F 2212/6024; G06F 2212/602; G06F 2212/281; G06F 2212/1024; G06F 12/0804; G06F 12/0862
  See application file for complete search history.

(56) References Cited

U.S. PATENT DOCUMENTS

| | | | |
|---|---|---|---|
| 6,044,439 A | 3/2000 | Ballard | |
| 6,976,258 B1 | 12/2005 | Goyal | |
| 7,062,642 B1 | 6/2006 | Langrind | |
| 7,457,870 B1 | 11/2008 | Lownsbrough | |
| 7,617,314 B1 | 11/2009 | Bansod | |
| 7,639,613 B1 | 12/2009 | Ghannadian | |
| 9,612,758 B1 * | 4/2017 | Liu | .................... G06F 12/0862 |
| 9,936,333 B2 | 4/2018 | Lau | |
| 2002/0055946 A1* | 5/2002 | Prager | .................. A63F 7/0676 |
| 2002/0161990 A1 | 10/2002 | Zhang | |
| 2003/0135612 A1 | 7/2003 | Huntington | |
| 2005/0052992 A1 | 3/2005 | Cloonan | |
| 2005/0257222 A1 | 11/2005 | Davis | |
| 2005/0268075 A1 | 12/2005 | Caprioli | |
| 2006/0028999 A1 | 2/2006 | Iakobashvili | |
| 2006/0143617 A1 | 6/2006 | Knauerhase | |

(Continued)

*Primary Examiner* — Larry T Mackall
(74) *Attorney, Agent, or Firm* — Shun Yao; Park, Vaughan, Fleming & Dowler LLP

(57) ABSTRACT

One embodiment of the present invention provides a system for efficiently warming up a cache. During operation, the system determines a cache prediction based on a user request. The cache prediction determines replication data from a database; the replication data is data that is to be replicated in the cache from the database for warming up the cache. The system generates a control signal comprising a replication proportion, which determines the volume of the replication data, for the replication model. The system then stores the replication data prior to receiving a request for the replication data, thereby warming up the cache with the replication data.

20 Claims, 6 Drawing Sheets

(56) References Cited

U.S. PATENT DOCUMENTS

| | | | |
|---|---|---|---|
| 2006/0190236 A1* | 8/2006 | Malloy | H04L 41/145 703/22 |
| 2006/0288015 A1 | 12/2006 | Schirripa | |
| 2007/0041331 A1 | 2/2007 | Ma | |
| 2007/0276990 A1 | 11/2007 | Mosek | |
| 2007/0283009 A1 | 12/2007 | Takemura | |
| 2008/0216086 A1 | 9/2008 | Tanaka | |
| 2008/0288661 A1 | 11/2008 | Galles | |
| 2009/0144731 A1 | 6/2009 | Brown | |
| 2009/0300210 A1 | 12/2009 | Ferris | |
| 2009/0307396 A1 | 12/2009 | Nogueras | |
| 2011/0106802 A1 | 5/2011 | Pinkney | |
| 2011/0173251 A1 | 7/2011 | Sandhu | |
| 2011/0265164 A1 | 10/2011 | Lucovsky | |
| 2011/0276951 A1 | 11/2011 | Jain | |
| 2011/0296488 A1 | 12/2011 | Dandekar | |
| 2012/0084262 A1 | 4/2012 | Dwarampudi | |
| 2012/0221611 A1 | 8/2012 | Watanabe | |
| 2012/0239896 A1 | 9/2012 | Sobel | |
| 2012/0324572 A1 | 12/2012 | Gordon | |
| 2013/0055241 A1 | 2/2013 | De | |
| 2013/0246619 A1 | 9/2013 | Raja | |
| 2014/0019689 A1 | 1/2014 | Cain, III | |
| 2014/0066101 A1 | 3/2014 | Lyman | |
| 2014/0177497 A1 | 6/2014 | Backholm | |
| 2014/0223427 A1 | 8/2014 | Bootland | |
| 2015/0120914 A1 | 4/2015 | Wada | |
| 2015/0120928 A1 | 4/2015 | Gummaraju | |
| 2015/0150003 A1 | 5/2015 | Emelyanov | |
| 2015/0169341 A1 | 6/2015 | Gulati | |
| 2015/0181617 A1 | 6/2015 | Luna | |
| 2015/0212919 A1 | 7/2015 | Srour | |
| 2015/0215816 A1 | 7/2015 | Abou-Elkheir | |
| 2015/0347262 A1 | 12/2015 | Vyas | |
| 2016/0021211 A1 | 1/2016 | Yellin | |
| 2016/0080229 A1 | 3/2016 | Kobayashi | |
| 2016/0162320 A1 | 6/2016 | Singh | |

* cited by examiner

US 11,055,223 B2

EFFICIENT CACHE WARM UP BASED ON USER REQUESTS

RELATED APPLICATION

Under 35 U.S.C. § 119, this application claims the benefit and right of priority of Chinese Patent Application No. 201510425549.X, filed 17 Jul. 17, 2015.

BACKGROUND

1. Field

The present invention relates to the technical field of virtual hosting and, in particular, relates to a method and system for isolating virtual hosts from each other on a network server.

2. Related Art

A data processing system (e.g., a network server) typically stores data in a database in a local storage device. Some data stored in the database can typically have a large number of requests, leading to an increased drain on the resources, such as processing capability and storage, of the system. Furthermore, such requests can arrive simultaneously. Under such circumstances, to reduce load on the system, the system can cache a subset, which has the most significant volume of requests, of the data in a cache in a faster-access storage (e.g., in the memory of the system). Since the cache can be accessed more readily without increasing the load on the database access, overall system performance can improve.

When a specific piece of data (e.g., a data object) is requested, the system usually provides the data to the requester from the database and replicates a copy in the cache. Subsequent requests for that piece of data are then addressed from the cache. As a result, when a piece of data is online for the first time, that data may not be in the cache. If that data is a significant and important piece of data (e.g., breaking news or a highly anticipated product profile), the data can be accessed from the database, thereby adding load to the system. To improve the performance, such data can be loaded into the cache before it is requested. This process is referred to as cache warm up.

With existing technologies, a system can traverse a database to find all data and replicate the data into the cache in advance. However, such traversal requires extensive computation and a large cache space in which to store the data. To improve the efficiency, the system can store only a subset of the data in the cache. However, the most demanded data (i.e., "the hotspot data") may not be in the subset stored in the cache. To identify the most demanded contents, the system can simulate (e.g., using synthetic simulation) a user request so that data is read naturally from the database and then replicated in a cache. However, when the load on the system is large, such simulated traffic increases the load on the system and may cause bottleneck and unavailability.

While cache warm up brings many desirable features to a data processing system, some issues remain unsolved in the development of an efficient cache warm up process.

SUMMARY

One embodiment of the present application provides a system for efficiently warming up a cache. During operation, the system determines a cache prediction based on a user request. The cache prediction determines replication data from a database; the replication data is data that is to be replicated in the cache from the database for warming up the cache. The system generates a control signal comprising a replication proportion, which determines the volume of the replication data, for the replication model. The system then stores the replication data prior to receiving a request for the replication data, thereby warming up the cache with the replication data.

In a variation of this embodiment, the cache prediction is a data prediction model derived from data requested in the user request.

In a further variation, the data prediction model predicts hotspot data in the database prior to receiving a request for the hotspot data. The hotspot data is the most demanded data in the database.

In a variation of this embodiment, the system linearly increases the replication proportion for the replication model.

In a variation of this embodiment, the system determines whether the data requested in the user request is available in the cache. If available, the system obtains the requested data from the cache. Otherwise, the system obtains the requested data from the database.

In a further variation, the system prevents the requested data from replicating to the cache based on a replication policy.

In a variation of this embodiment, the system disables cache warm up for the cache, thereby retaining current content of the cache.

BRIEF DESCRIPTION OF THE DRAWINGS

The accompanying drawings herein, which are incorporated herein and constitute a part of the specification, illustrate several exemplary embodiments of the present application and, together with the description, serve to illustrate the present application, construing no limitation thereto. In the drawings.

In the figures, like reference numerals refer to the same figure elements.

DETAILED DESCRIPTION OF EMBODIMENTS

Embodiments of the present invention solve the problem of facilitating efficient cache warm up for a data processing system by modeling data to be replicated in the cache based on real traffic (i.e., actual user requests). With existing technologies, to facilitate cache warm up, the database is traversed and data is replicated in a large cache. If only a subset of the data is replicated to reduce the cache size, hotspot data may not get replicated. If simulated traffic is used to select the subset of data to be replicated, it can increase the load on the system.

To solve these problems, embodiments of the present invention facilitate cache warm up based on user requests. Since warming up the cache includes determining which data is replicated in the cache, replicating data according to user requests improves the probability that pre-written data includes the data corresponding to the user request, thereby improving the hit rate of the cache and improving the caching effect. Upon receiving a user request, a data processing system generates a cache prediction based on the request and uses the model to replicate data from the database to the cache. In addition, if the requested data is not in the cache, the system acquires the requested data from the database and serves the user request using the acquired data. The data corresponding to the user request can also be replicated in the cache.

In some embodiments, the system can generate (or receive from a user) a control signal, which dictates the proportion of the replication based on traffic volume. For example, a larger data volume associated with the user request results in a control signal with a higher replication proportion of the data. In some embodiments, the system gradually and linearly increases the replication proportion of the data. This allows the system to implement smooth and safe cache warm up with a high hit rate and without increasing the load of the database. In this way, embodiments of the present invention can warm up the cache with high performance and high concurrency without affecting the original performance of the system.

Figure 1:
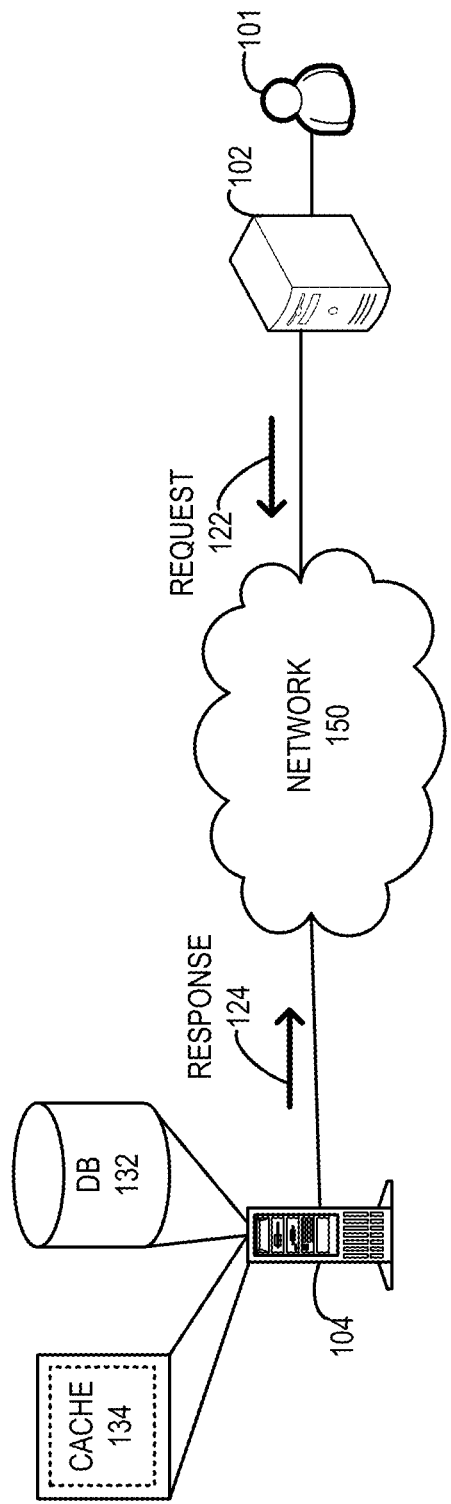
FIG. 1 illustrates an exemplary data processing system facilitating cache warm up based on user requests, in accordance with an embodiment of the present application.

FIG. 1 illustrates an exemplary data processing system facilitating cache warm up based on user requests, in accordance with an embodiment of the present application. During operation, if a user 101 wishes to obtain some data, a client device 102 of user 101 can issue a request 122 (e.g., an HTTP request) to a data processing system 104 (e.g., a server). Device 102 and system 104 are coupled to each other via network 150, which can be a local or wide area network. System 104 can operate as a host machine for a plurality of virtual machines, each of which can operate as a server. System 104 includes a database 132 as a data source and a cache 134 to improve performance.

With existing technologies, to facilitate cache warm up, system 104 traverses database 132 and replicates data in cache 134. However, this solution involves replicating a large volume of data in cache 134, thus requiring cache 134 to be significantly large. If only a subset of the data is replicated to reduce the cache size, hotspot data in database 132 may not get replicated in cache 134. If system 104 uses simulated traffic to select the subset of data to be replicated, this technique increases the load on system 104.

To solve these problems, system 104 facilitates cache warm up based on user requests, such as request 122. Since warming up cache 134 includes determining which data is replicated in cache 134 from database 132, replicating data according to user requests improves the probability that pre-written data in cache 134 includes the data corresponding to the user request, thereby improving the hit rate of cache 134 and improving the caching effect for system 104. During operation, upon receiving request 122, system 104 generates a cache prediction based on request 122 and uses the model to replicate data from database 132 to cache 134. In addition, if the requested data is not in cache 134, system 104 acquires the requested data from database 132 and sends a response 124 comprising the acquired data to device 102 via network 150. System 104 may replicate the acquired data in cache 134 as well.

Request 122 and response 124 can be data frames. In this disclosure, the term "frame" refers to a group of bits that can be transported together across a network. "Frame" should not be interpreted as limiting embodiments of the present invention to layer-2 networks. "Frame" can be replaced by other terminologies referring to a group of bits, such as "packet," "cell," "message," or "datagram."

In some embodiments, system 104 can generate a control signal, which dictates the proportion of the replication based on traffic volume. For example, a larger data volume associated with request 122 results in a control signal with a higher replication proportion of the data. In some embodiments, system 104 gradually and linearly increases the replication proportion of the data. This allows system 104 to implement smooth and safe cache warm up with a high hit rate and without increasing the load of database 132. In this way, system 104 can warm up cache 134 with high performance and high concurrency without affecting the original performance of system 104.

Figure 2A:
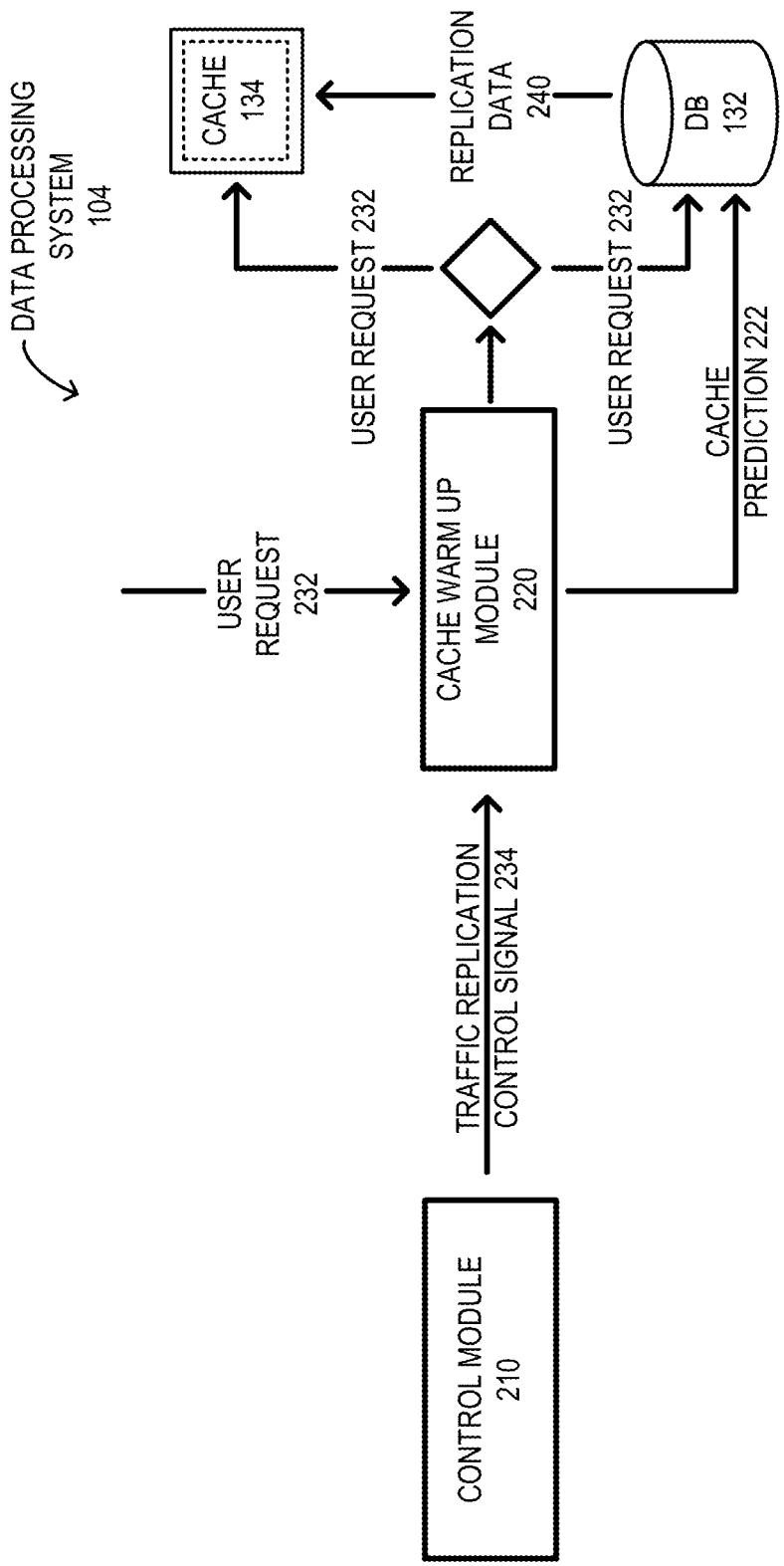
FIG. 2A illustrates an exemplary schematic of a data processing system facilitating cache warm up based on user requests, in accordance with an embodiment of the present application.

FIG. 2A illustrates an exemplary schematic of a data processing system facilitating cache warm up based on user requests, in accordance with an embodiment of the present application. In this example, system 104 includes a cache warm up module 220, which can generate a cache prediction based on which system 104 replicates data from database 132 to cache 134. Data replicated to cache 134 can be referred to as replication data. System 104 can also include a control module 210, which generates the control signal that dictates the proportion of replication data.

During operation, data processing system 104 receives a user request 232. Upon receiving request 232, system 104 passes the request through cache warm up module 220, which generates a cache prediction 222 based on request 232. System 104 applies the model to database 132 to determine replication data 240. For example, if the user request is for a current traffic update, cache prediction 222 can represent the current traffic load. By applying cache prediction 222 to database 132, system 104 selects data associated with the current traffic load from database 132 as replication data 240.

Furthermore, cache warm up module 220 can receive a traffic replication control signal 234 from control module 210. Control signal 234 dictates the proportion of replication data 240. Control module 210 gradually and linearly increases the replication proportion of the data to implement smooth and safe cache warm up with a high hit rate and without increasing the load of database 132. Based on control signal 234, cache warm up module 220 can incorporate this proportion into cache prediction 222. For example, a higher proportion of the data causes cache prediction 222 to indicate a larger volume of replication data 240.

In addition, system 104 queries cache 134 to determine whether the requested data is in cache 134. If the requested data is in cache 134, a cache hit occurs and system 104 acquires the requested data from cache 134. On the other hand, if the requested data is not in cache 134, system 104 acquires the requested data from database 132. It should be noted that system 104 may or may not replicate the acquired data in cache 134 depending on a replication policy. If the replication policy indicates that data is loaded in cache 134 only based on a cache prediction from cache warm up module 220 and if the acquired data does not fit the replication model, system 104 does not replicate the acquired data in cache 134. On the other hand, if the replication policy indicates that any cache miss results in replication of the corresponding data, system 104 replicates the acquired data in cache 134.

Figure 2B:
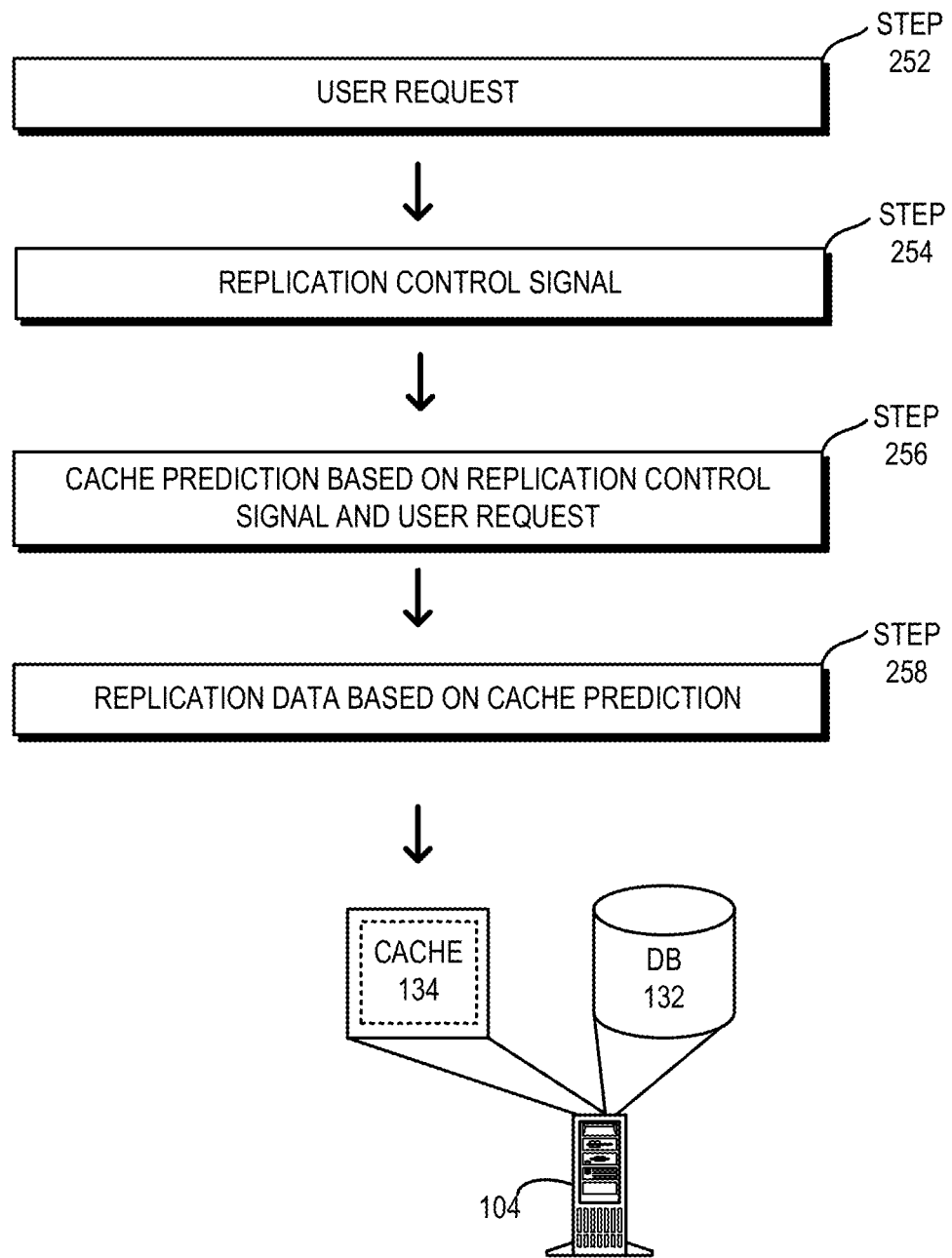
FIG. 2B illustrates an exemplary process of a data processing system facilitating cache warm up based on user requests, in accordance with an embodiment of the present application.

FIG. 2B illustrates an exemplary process of a data processing system facilitating cache warm up based on user requests, in accordance with an embodiment of the present application. This example shows different steps in the cache warm up process. In initial step 252, system 104 receives a user request. Receiving a user request can be considered as one of the triggers for the cache warm up process. Other triggers include, but are not limited to, a user command, a time of the day, and a periodic cycle. In the next step 254, system 104 generates the replication control signal. This control signal indicates the replication proportion, thereby determining the volume of replication data. This proportion can be determined based on one or more of: a ratio of the current user request's data volume and previous user request's data volume, a linear increment or decrement, and a weighted average.

In the next step 256, system 104 generates a cache prediction based on the replication control signal of step 254 and the user request of step 252. This cache prediction determines which data is replicated in cache 134. The cache prediction can indicate one or more of: one or more rows or columns of database 132 and a retrieval command on database 132 (e.g., an SQL select command). The cache prediction is a data prediction model derived from the requested data. This prediction model can represent the current hotspot data. In the next step 258, system 104 applies the cache prediction to the database to obtain the replication data and loads the replication data to cache 134. The replication data can include the hotspot data in database 132.

For example, if the user request is associated with stock information of a particular company, the cache prediction can indicate stock information of the prominent companies of the same industry. In this way, the cache prediction predicts hotspot data in database 132 prior to receiving a request for the hotspot data. The number of companies can be determined by the replication control signal. Based on the control signal, the cache prediction can indicate stock information of only a few companies or a large number of companies. Suppose that the cache prediction indicates stock information of the top 20% of companies of a particular industry. System 104 applies the cache prediction to the database to obtain replication data comprising stock information of the top 20% of companies of the industry and loads the replication data to cache 134.

Figure 3A:
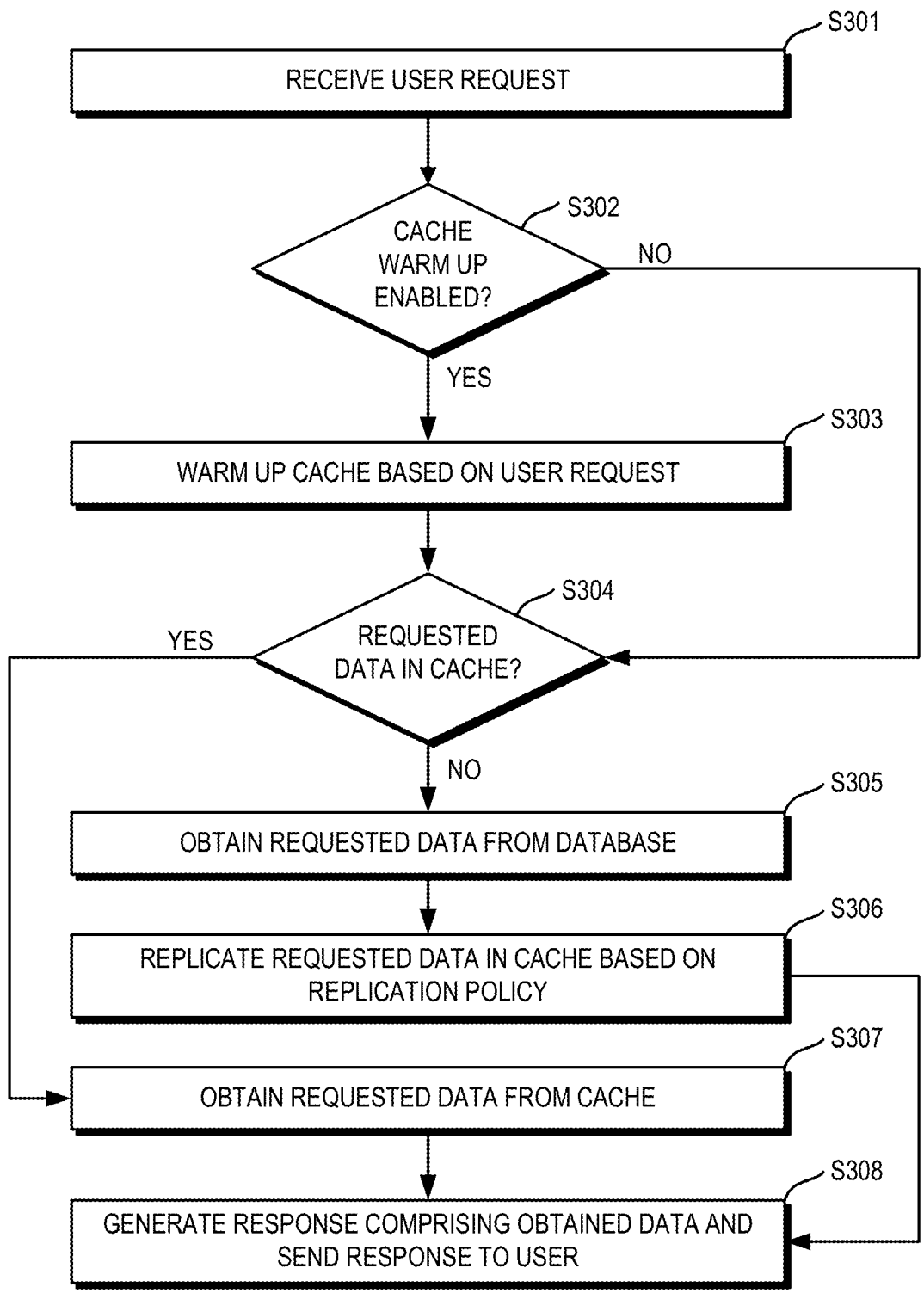
FIG. 3A presents a flowchart illustrating the process of a data processing system responding to a user request, in accordance with an embodiment of the present application.

FIG. 3A presents a flowchart illustrating the process of a data processing system responding to a user request, in accordance with an embodiment of the present application. During operation, the system receives a user request (operation S301). The system then checks whether the cache warm up process is currently enabled (operation S302). This operation allows the system to stop the cache warm up process, if needed. For example, the system can maintain the current cache by disabling the cache warm up process. In some embodiments, the system can indicate the cache warm up process to be disabled via the replication control signal. For example, the system can generate a replication control signal with a zero value for the replication proportion, thereby indicating that no data should be replicated in the cache based on the received user request.

If the cache warm up process is currently enabled, the system warms up the cache based on the user request (operation S303), as described in conjunction with FIGS. 2A and 2B. Upon warming up the cache based on the user request (operation S303) or if the cache warm up process is not currently enabled (i.e., disabled) (operation S302), the system checks whether the requested data is in the cache (operation S304). In some embodiments, the system sends a query to the cache to determine whether the cache includes the requested data. If the requested data is not in the cache, the system obtains the requested data from the database (operation S305). The system can also replicate the requested data in the cache based on a replication policy (operation S306). Updating the cache with the requested data can be the default cache update policy.

If the requested data is in the cache, the system obtains the requested data from the cache (operation S307). If the cache only holds a portion of the requested data, the system obtains requested data from both the cache and the database. Upon obtaining the requested data (operations S305 and/or S307), the system generates a response comprising the obtained data and sends the response to the user (operation S308). Sending the response to the user can include determining an output port associated with the user and transmitting the response via the output port. The user request as well as the response can be data frames.

Figure 3B:
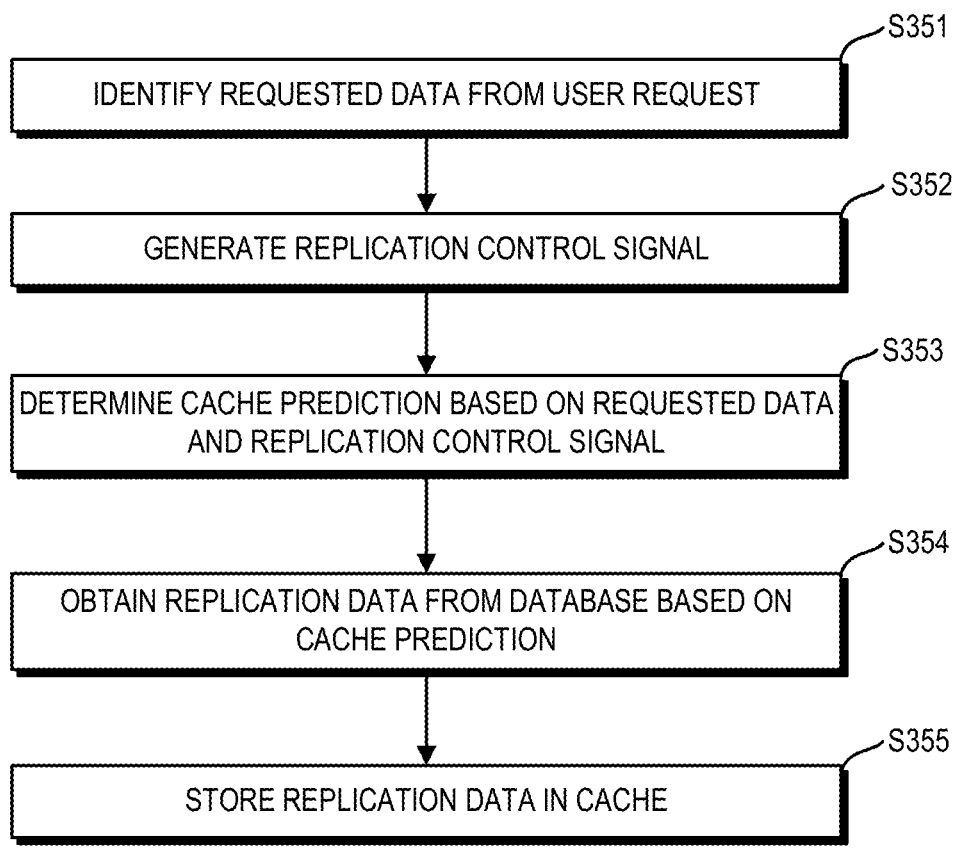
FIG. 3B presents a flowchart illustrating the process of a data processing system warming up a cache based on the user request, in accordance with an embodiment of the present application.

FIG. 3B presents a flowchart illustrating the process of a data processing system warming up a cache based on the user request, in accordance with an embodiment of the present application. During operation, the system identifies the requested data from the user request (operation S351) and generates a replication control signal (operation S352). The system then determines a cache prediction based on the requested data and the replication control signal (operation S353). The system obtains the replication data from the database based on the cache prediction (operation S354) and stores the replication data in the cache (operation S355).

Exemplary Apparatus

Figure 4:
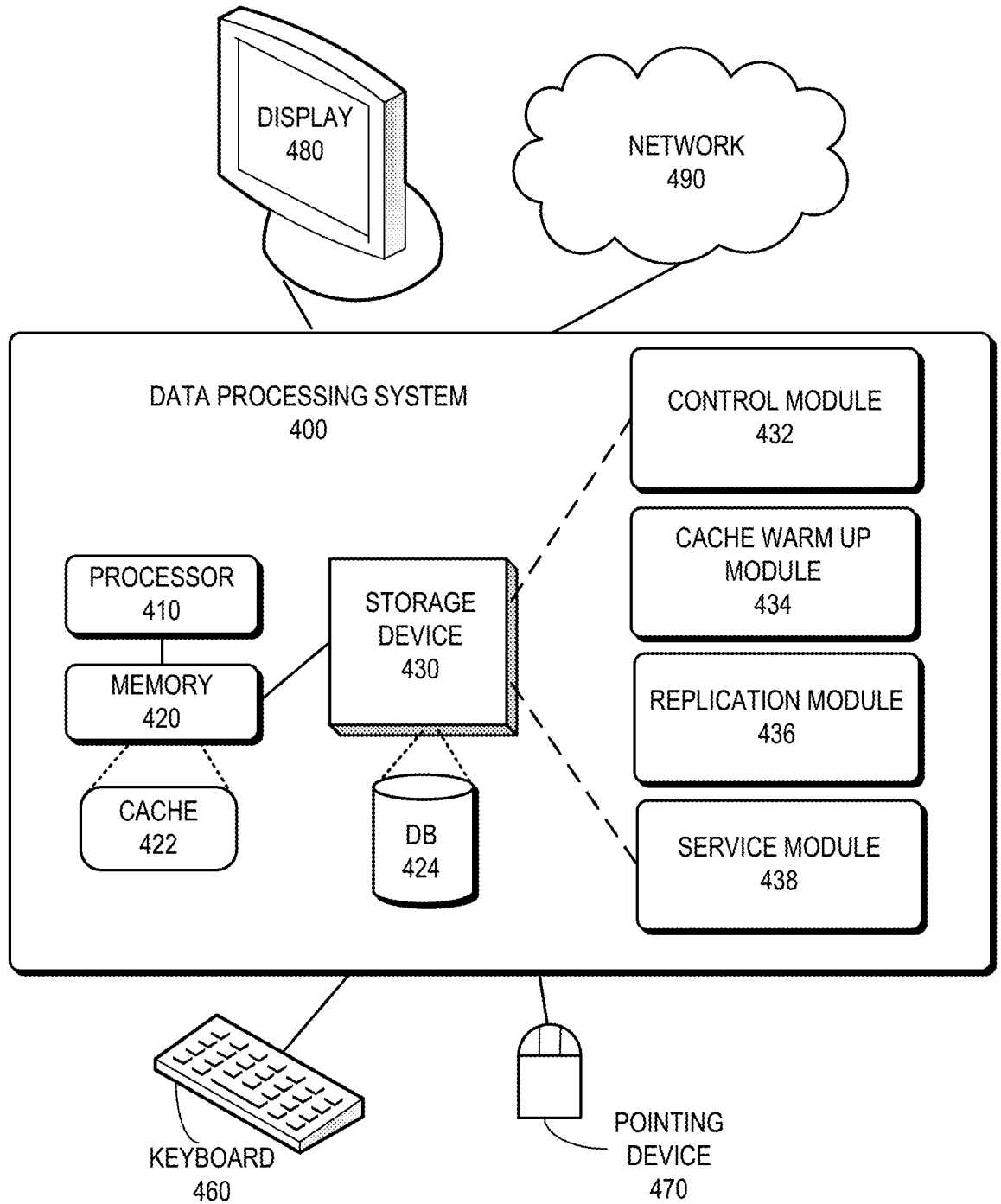
FIG. 4 presents an exemplary data processing system with efficient cache warm up support, in accordance with an embodiment of the present application.

FIG. 4 presents an exemplary data processing system with efficient cache warm up support, in accordance with an embodiment of the present application. A data processing system 400 can facilitate efficient cache warm up. System 400 includes a processor 410, a memory 420, and a storage device 430. Storage device 430 typically stores instructions that can be loaded into memory 420 and executed by processor 410 to perform the methods described above. In one embodiment, the instructions in storage device 430 can implement a control module 432, a cache warm up module 434, a replication module 436, and a service module 438, all of which can communication with each other through various means. Storage device 430 can store a database 424 and memory 420 can store a cache 422.

In some embodiments, modules 432, 434, 436, and 438 can be partially or entirely implemented in hardware and can be part of processor 410. Further, in some embodiments, data processing system 400 may not include a separate processor and memory. Instead, in addition to performing their specific tasks, modules 432, 434, 436, and 438, either separately or in concert, may be part of special-purpose computation engines.

Storage device 430 stores programs to be executed by processor 410. Specifically, storage device 430 stores a program that implements a web server. During operation, an application program can be loaded from storage device 430 into memory 420 and executed by processor 410. As a result, data processing system 400 can perform the functions described above. Data processing system 400 can be further coupled to an optional display 480, a keyboard 460, and a pointing device 470, and can be coupled via one or more network interfaces to a network 490.

During operation, service module 438 receives a user request (e.g., via a port of system 400) from a user. Control module 432 generates a replication control signal for the user request. Cache warm up module 434 determines a cache prediction based on the data requested in the user request and the replication control signal. Replication module 436 obtains replication data from database 424 based on the cache prediction and stores the replication data in cache 422. Service module 438 determines whether the requested data is in cache 422. If so, service module 438 obtains the requested data from cache 422. Otherwise, service module 438 obtains the requested data from database 424.

If the requested data is obtained from database 424, replication module 436 can replicate the obtained data in cache 422 based on a replication policy. Furthermore, service module 438 can generate a response comprising the requested data and sends the requested data to the user. In some embodiments, replication module 436 can operate as a or in conjunction with a database management system (DBMS) running on data processing system 400. Furthermore, service module 438 can operate as a or in conjunction with a web server running on data processing system 400.

Embodiments of the present invention may be implemented on various universal or dedicated computer system environments or configurations. For example, such computer systems may include personal computers, server computers, handheld or portable devices, tablet-type devices, multiprocessor systems, microprocessor-based systems, set-top boxes, programmable electronic consumption devices, network PCs, minicomputers, mainframe computers, distributed computing environments including any of the above systems or devices, and the like.

Embodiments of the present invention may be described within the general context of computer-executable instructions executed by a computer, such as a program module. Generally, the program module includes a routine, a program, an object, an assembly, a data structure and the like for implementing particular tasks or achieving particular abstract data types. Embodiments of the present invention may also be implemented in distributed computing environments, in which tasks are performed by remote processing devices connected via a communication network. In the distributed computing environments, program modules may be located in local and remote computer storage media that may include a storage device.

The data structures and computer instructions described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-implemented method for efficiently warming up a cache of a database, comprising:
   receiving a first user request for data from the database;
   applying, by a computing system, a replication model to the database to generate a cache prediction based on the data requested by the first user request, wherein the cache prediction predicts data associated with subsequent requests of the first user request;
   generating a control signal comprising a replication proportion based on the replication model, wherein the replication proportion indicates the volume of replication data that is to be replicated in the cache from the database;
   determining the replication data from the database based on the cache prediction and the replication proportion;
   storing the replication data in the cache prior to receiving the subsequent requests, thereby warming up the cache with the replication data; and
   serving a second user request for data from the cache, wherein the data requested by the second user request is predicted by the replication model based on the first user request.

2. The method of claim 1, wherein the replication model is a data prediction model derived from the data requested in the first user request.

3. The method of claim 1, wherein the replication model predicts hotspot data in the database prior to receiving a request for the hotspot data, wherein the hotspot data is most demanded data in the database, and wherein the second user request includes the request for the hotspot data.

4. The method of claim 1, further comprising linearly increasing the replication proportion for the replication model.

5. The method of claim 1, further comprising:
   determining whether the data requested by the first user request is available in the cache;
   in response to determining that the data is available in the cache, obtaining the requested data from the cache; and
   in response to determining that the data is not available in the cache, obtaining the requested data from the database.

6. The method of claim 5, further comprising refraining from replicating the data in the cache based on a replication policy.

7. The method of claim 1, further comprising disabling further cache warm up for the cache, thereby retaining current content of the cache.

8. A non-transitory computer-readable storage medium storing instructions that when executed by a computer cause the computer to perform a method for efficiently warming up a cache of a database, the method comprising:
receiving a first user request for data from the database;
applying a replication model to the database to generate a cache prediction based on the data requested by the first user request, wherein the cache prediction predicts data associated with subsequent requests of the first user request;
generating a control signal comprising a replication proportion based on the replication model, wherein the replication proportion indicates the volume of replication data that is to be replicated in the cache from the database;
determining the replication data from the database based on the cache prediction and the replication proportion;
storing the replication data in the cache prior to receiving the subsequent requests, thereby warming up the cache with the replication data; and
serving a second user request for data from the cache, wherein the data requested by the second user request is predicted by the replication model based on the first user request.

9. The non-transitory computer-readable storage medium of claim 8, wherein the replication model is a data prediction model derived from the data requested in the first user request.

10. The non-transitory computer-readable storage medium of claim 8, wherein the replication model predicts hotspot data in the database prior to receiving a request for the hotspot data, wherein the hotspot data is most demanded data in the database, and wherein the second user request includes the request for the hotspot data.

11. The non-transitory computer-readable storage medium of claim 8, wherein the method further comprises linearly increasing the replication proportion for the replication model.

12. The non-transitory computer-readable storage medium of claim 8, wherein the method further comprises:
determining whether the data requested by the first user request is available in the cache;
in response to determining that the data is available in the cache, obtaining the requested data from the cache; and
in response to determining that the data is not available in the cache, obtaining the requested data from the database.

13. The non-transitory computer-readable storage medium of claim 12, wherein the method further comprises refraining from replicating the data in the cache based on a replication policy.

14. The non-transitory computer-readable storage medium of claim 8, wherein the method further comprises disabling further cache warm up for the cache, thereby retaining current content of the cache.

15. A computing system for efficiently warming up a cache, the computing system comprising:
a processor; and
a memory coupled to the processor and storing instructions, which when executed by the processor cause the processor to perform a method of a database, the method comprising:
receiving a first user request for data from the database;
applying a replication model to the database to generate a cache prediction based on the data requested by the first user request, wherein the cache prediction predicts data associated with subsequent requests of the first user request;
generating a control signal comprising a replication proportion based on the replication model, wherein the replication proportion indicates the volume of replication data that is to be replicated in the cache from the database;
determining the replication data from the database based on the cache prediction and the replication proportion; and
storing the replication data in the cache prior to receiving the subsequent requests, thereby warming up the cache with the replication data; and
serving a second user request for data from the cache, wherein the data requested by the second user request is predicted by the replication model based on the first user request.

16. The computing system of claim 15, wherein the replication model is a data prediction model derived from the data requested in the first user request.

17. The computing system of claim 15, wherein the replication model predicts hotspot data in the database prior to receiving a request for the hotspot data, wherein the hotspot data is most demanded data in the database, and wherein the second user request includes the request for the hotspot data.

18. The computing system of claim 15, wherein the method further comprises linearly increasing the replication proportion for the replication model.

19. The computing system of claim 15, wherein the method further comprises:
determining whether the data requested by the first user request is available in the cache;
in response to determining that the data is available in the cache, obtaining the requested data from the cache; and
in response to determining that the data is not available in the cache, obtaining the requested data from the database.

20. The computing system of claim 15, wherein the method further comprises disabling further cache warm up for the cache, thereby retaining current content of the cache.

* * * * *